United States Patent
Dunagan et al.

(10) Patent No.: US 7,551,552 B2
(45) Date of Patent: Jun. 23, 2009

(54) METHOD FOR PROVIDING GUARANTEED DISTRIBUTED FAILURE NOTIFICATION

(75) Inventors: John Dunagan, Bellevue, WA (US); Nicholas J. A. Harvey, Cambridge, MA (US); Michael B. Jones, Redmond, WA (US); Dejan Kostić, Durham, NC (US); Marvin M. Theimer, Bellevue, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 10/686,658

(22) Filed: Oct. 17, 2003

(65) Prior Publication Data

US 2005/0083834 A1      Apr. 21, 2005

(51) Int. Cl.
 *H04J 1/16* (2006.01)
(52) U.S. Cl. ............ 370/221; 370/242; 370/256
(58) Field of Classification Search .......... 370/216, 370/217, 221, 241, 242, 243, 244, 245, 248
See application file for complete search history.

(56) References Cited

U.S. PATENT DOCUMENTS

| | | | | |
|---|---|---|---|---|
| 5,905,714 | A * | 5/1999 | Havansi | 370/242 |
| 6,396,815 | B1 * | 5/2002 | Greaves et al. | 370/256 |
| 6,778,833 | B1 * | 8/2004 | Fortuna | 455/446 |
| 6,801,496 | B1 * | 10/2004 | Saleh et al. | 370/221 |
| 6,865,149 | B1 * | 3/2005 | Kalman et al. | 370/225 |
| 7,092,356 | B2 * | 8/2006 | Rabie et al. | 370/230 |
| 7,180,866 | B1 * | 2/2007 | Chartre et al. | 370/242 |
| 7,218,645 | B2 * | 5/2007 | Lotter et al. | 370/469 |
| 7,246,160 | B2 | 7/2007 | Yamabe | |
| 2003/0058804 | A1 * | 3/2003 | Saleh et al. | 370/254 |
| 2003/0137932 | A1 * | 7/2003 | Nishioka et al. | 370/216 |
| 2003/0185148 | A1 * | 10/2003 | Shinomiya et al. | 370/216 |
| 2005/0015511 | A1 * | 1/2005 | Izmailov et al. | 709/238 |
| 2005/0068954 | A1 * | 3/2005 | Liu et al. | 370/390 |

OTHER PUBLICATIONS

A. Adya, W. J. Bolosky, M. Castro, G. Cermak, R. Chaiken, J. R. Douceur, J. Howell, J. R. Lorch, M. Theimer, and R. P. Wattenhofer, "FARSITE: Federated, Available, and Reliable Storage for an Incompletely Trusted Environment," *In Proceedings of the 5th Symposium on Operating Systems Design and Implementation (OSDI)*, 2002.

(Continued)

*Primary Examiner*—Ricky Ngo
*Assistant Examiner*—Kan Yuen
(74) *Attorney, Agent, or Firm*—Wolf, Greenfield & Sacks, P.C.

(57) ABSTRACT

A guaranteed distributed failure notification method is described, wherein a failure notification (FN) facility allows applications using the facility to create FN groups to which the application associates an application state. The application registers failure handlers with the FN facility on nodes in the FN group; each failure handler is associated with a specific FN group. When, on a given node, the FN facility learns of a failure in the FN group, the facility executes the associated failure handler on that node. System failures detected by the application are signaled to other FN group members using the facility. The facility detects system failures that occur in an overlay network on which the facility is implemented, and signals a failure notification to the other FN group members.

41 Claims, 14 Drawing Sheets

OTHER PUBLICATIONS

L. F. Cabrera, M. B. Jones, and M. Theimer, "Herald: Achieving a global event notification service," *In HotOS VIII*, May 2001.

A. Adya, W. J. Bolosky, M. Castro, G. Cermak, R. Chaiken, J. R. Douceur, J. Howell, J. R. Lorch, M. Theimer, and R. P. Wattenhofer, "FARSITE: Federated, Available, and Reliable Storage for an Incompletely Trusted Environment," *In Proceedings of the 5th Symposium on Operating Systems Design and Implementation (OSDI)*, 2002.

J. Halpern and Y. Moses, "Knowledge and common knowledge in a distributed environment," *Journal of the ACM*, 37:549-587, 1990.

N. J. A. Harvey, M. B. Jones, S. Saroiu, M. Theimer, and A. Wolman, "SkipNet: A Scalable Overlay Network with Practical Locality Properties," *In Proceedings of Fourth USENIX Symposium on Internet Technologies and Systems (USITS '03)*, Mar. 2003.

S. Ratnasamy, P. Francis, M. Handley, R. Karp, and S. Shenker, "A Scalable Content-Addressable Network," *In Proceedings of ACM SIGCOMM*, Aug. 2001.

A. Rowstron and P. Druschel. "Pastry: Scalable, decentralized object location and routing for large-scale peer-to-peer systems," *In International Conference on Distributed Systems Platforms (Middleware)*, pp. 329-350, Heidelberg, Germany, Nov. 2001.

I. Stoica, R. Morris, D. Karger, M. F. Kaashoek, and H. Balakrishnan, "Chord: A Scalable Peer-To-Peer Lookup Service for Internet Applications," *In Proceedings of ACM SIGCOMM*, Aug. 2001.

B. Y. Zhao, J. D. Kubiatowicz, and A. D. Joseph, "Tapestry: An Infrastructure for Fault-Tolerant Wide-area Location and Routing," *Technical Report UCB//CSD-01-1141*, UC Berkeley, Apr. 2001.

R. van Renesse, K. P. Birman, R. Friedman, M. Hayden, and D. A. Karr, "A framework for protocol composition in Horus," *In Proceedings of the Fourteenth Annual ACM Symposium on Principles of Distributed Computing*, pp. 80-89, Ottawa, Ontario, Canada, Aug. 2-23, 1995.

R. van Renesse, Y. Minsky, and M. Hayden, "A gossip-style failure detection service," *Proceedings of Middleware*, 1998.

N. Hu and P. Steenkiste, "Evaluation and Characterization of Available Bandwidth Probing Techniques," *In the IEEE JSAC Special Issue in Internet and WWW Measurement, Mapping, and Modeling*, vol. 21(6), Aug. 2003.

D. Karger, P. Klein, and R. Tarjan, "A randomized linear-time algorithm to find minimum spanning trees," *Journal of the Association for Computing Machinery*, 42(2), 1995.

M. Castro, P. Druschel, A.-M. Kermarrec, and A. Rowstron, "Scribe: A large-scale and decentralized application-level multicast infrastructure," *IEEE Journal on Selected Areas in Communications (JSAC) (Special issue on Network Support for Multicast Communications)*, 20(8), Oct. 2002.

Raynal M. et al., "Group membership failure detection: a simple protocol and its probabilistic analysis", Distributed Systems Engineering, Institute of Physics Publishing, Bristol, GB, vol. 6, No. 3, Sep. 1, 1999, pp. 95-102, XP020073385.

Zhuang S. Q. et al., "Bayeux: An Architecture for Scalable and Fault-Tolerant Wide-Area Data Dissemination", Proceedings of the 11th International Workshop on Network and Operating Systems Support for Digital Audio and Video, NOSSDAV 2001, Port Jefferson, NY, Jun. 25-26, 2001, pp. 11-20, XP001134292.

Dunagan J. et al., "Fuse: Lightweight Guaranteed Distributed Failure Notification", Proceedings of the Sixth Symposium on Operating Systems Design and Implementation (OSDI '04), Usenix Assoc., Berkeley, CA, 2004, pp. 151-166, XP002439223.

* cited by examiner

```
// Creates an FN group containing the nodes in the set
FuseId CreateGroup(NodeId[] set)

// Registers a callback function to be invoked
// when a notification occurs for the FN group
void RegisterFailureHandler(Callback handler, FuseId id)

// Allows the application to explicitly cause
// transmission of a failure notification
void SignalFailure(FuseId id)
```

FIG. 4a

```
// Creates an FN group containing the nodes in the
// set and directs the nodes in the set to associate
// the application-specific state with the FN group
FuseId CreateGroup(NodeId[] set, ApplicationState state)

// Registers a callback function to be invoked
// when a notification occurs for the FN group
void RegisterFailureHandler(Callback handler, FuseId id)

// Allows the application to explicitly cause
// transmission of a failure notification
void SignalFailure(FuseId id)
```

FIG. 4b

METHOD FOR PROVIDING GUARANTEED DISTRIBUTED FAILURE NOTIFICATION

TECHNICAL FIELD

This invention relates generally to failure notification in a distributed system and, more particularly, relates to a method for guaranteeing that nodes in a distributed system will receive notification of a failure in any part of that system.

BACKGROUND OF THE INVENTION

One of the challenges in building distributed systems is to avoid situations where one part of a system remains blissfully ignorant of important failure conditions that are occurring elsewhere in the system. Applications running on nodes in the system rely on one another for an application state, such as a piece of data, a resource, a variable, an operating condition, etc. Therefore, ignorance of a failure in the system can result in both inaccurate behavior and an orphaned state. For example, consider Nodes A, B, and C in a distributed system. Applications running on Nodes B and C depend upon Node A for a particular application state, such as the current temperature T. If Node A fails, or a communication link between Nodes A and B or A and C fails, the application state is no longer valid. If Nodes B and C do not know that Node A failed, they assume their current value for T is valid. However, when the actual T changes, the applications on Nodes B and C using the invalid T will produce erroneous results. Accordingly, there is a need for a failure detection and notification service to inform nodes of failures in the system.

Failure detection in distributed computer systems is difficult. Foundational work on distributed systems showed that it is generally impossible to distinguish between a remote computer having crashed, a remote computer running very slowly, the network being down, and several other failure scenarios. Because of this, failure detection services cannot perfectly report all failures and only report failures under some circumstances.

Previous failure detection services have been used in distributed computing environments that attempt to achieve reliability and availability by running the same program on several computers in parallel. In these systems, every input is sent to all of the computers. In this context, which is sometimes referred to as "lock-step replication" or "virtual synchrony," each of the several computers receives all of the inputs, does some computation, and (typically) sends some output back to the user. The user then aggregates the responses, perhaps by taking as definitive the response that appeared most often (if the responses happen to be non-identical). Thus, it is often necessary for each of the several computers to agree about the identity of all the other computers in the group. The role of the failure detection service is then to detect computers that have failed, and to propagate this information to all the members of the group. The failure detection service is generally tightly integrated with a group membership service; the group membership service is the local service each computer runs that is authoritative on the question of which computers are available to participate in the distributed computing environment (possibly from joining in new computers to replace computers that are believed to have failed). These failure detection services are generally not suitable for handling large numbers of machines simultaneously, and they generally provide reliable failure notification contingent on the continuing operation of a reliable messaging substrate.

Another failure detection service seeks to ensure that most computers agree about which other computers are functioning in the face of some failures, but not all failures. For example, the failure notification service detects only computers that have become entirely unreachable, and does not detect communication failures that prevent only certain pairs of computes from communicating. Furthermore, the failure notification service does not support the establishment of multiple small groups, and requires that all computers that are participating in the failure detection service to be aware of all other computers that are similarly participating.

There exists, therefore, a need in the art for a lightweight, distributed failure notification service that allows for the formation of failure notification groups, and guarantees that every computer in the failure notification group will be reliably notified of a system failure affecting the group.

SUMMARY OF THE INVENTION

The invention is generally directed to a method of guaranteeing failure notification in a distributed system operating on a group of computers in a network. According to the invention, a failure notification (FN) group is formed of the group of computers in the distributed system. An FN group can be formed among all computers in the system, or among any subset of computers in the system. Furthermore, there may be multiple overlapping FN groups in use on the same set of computers in the system. The members of this FN group are reliably notified of any failure in the distributed system affecting members in the FN group, so that the group members may take appropriate action in response to the failure. If an FN group exists on a node (due to its earlier creation), an application on that node can associate a state with that group by registering a failure handler for the FN group. The invention guarantees that the failure handler will be called whenever a failure condition affects the FN group, and the failure handler can then act appropriately on the state. The act of creating an FN group also creates a unique identifier by which that FN group is known so that failure handlers may be correctly associated with the desired group.

When a computer in the FN group ascertains that a failure has occurred, that computer signals a failure notification for that FN group to all reachable FN group members. The FN group members receiving the failure notification and possessing a failure handler for the FN group (indicated by the unique identifier) will recognize that they should invoke the failure handler. The failure handlers associated with that FN group are then executed by group member to perform the appropriate application level action (for example, garbage collection) on the application state. If an FN group member is not reachable, but it has not crashed, it will still learn of the failure—failure to receive pings confirming the continued existence of a particular FN group from other FN group members will have the same effect as receiving an explicit notification of that FN group's death.

Nodes need not have registered a failure handler for every FN group that they belong to. For example, a particular Node A might create an FN group consisting of itself and another Node B in order to monitor whether Node B was reachable, without necessarily initiating an application level coordinated action between the two nodes at this time. In this example, Node B would have no reason to register a failure handler for this failure notification group.

To ascertain whether a failure has occurred, the invention provides three methods. In one method, each FN group member directly pings every other FN group member. If a pinged FN group member fails to respond to the ping, the FN group member sending the ping signals a failure notification to the FN group. In a second method, pinging responsibility is distributed using a tree topology. Each FN group member is established as a node in the tree, and each node is responsible for pinging only adjacent nodes in the tree. Again, if a pinged FN group member fails to respond to the ping, the FN group member sending the ping signals a failure notification to the FN group.

In a third method for ascertaining whether a failure has occurred, the invention is implemented on top of an existing overlay network. An overlay network provides application-level routing to computers in the network, while relying on the underlying network-level routing protocols (e.g. Internet Protocol (IP) routing) to implement the application-level routing. To maintain the overlay network, each computer keeps a list of a subset of computers in the overlay network, and periodically pings those computers to ascertain whether those computers are alive. The invention leverages this overlay maintenance by requiring that nodes in the overlay network inform the invention if a computer in their list is dead— i.e., it did not respond to a ping as expected. The invention then determines whether the reported overlay failure is along a communication path between two members of the FN group. If the overlay failure does break a path between two FN group members, a failure notification is signaled to all FN group members.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4a is pseudocode representing an application program interface of the present invention;

FIG. 4b is pseudocode representing another application program interface of the present invention;

DETAILED DESCRIPTION OF THE INVENTION

Figure 1A:
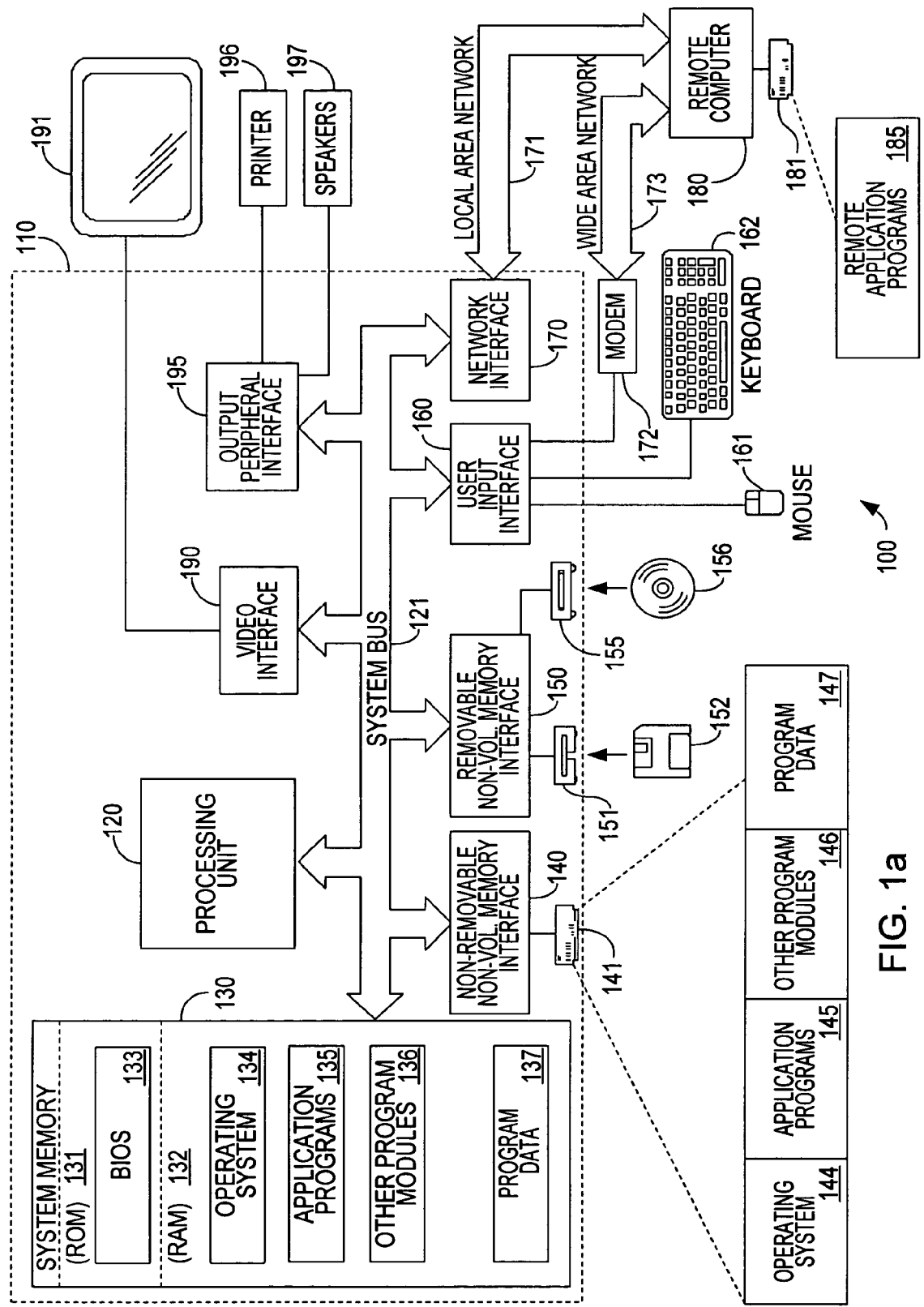
FIG. 1a is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 1B:
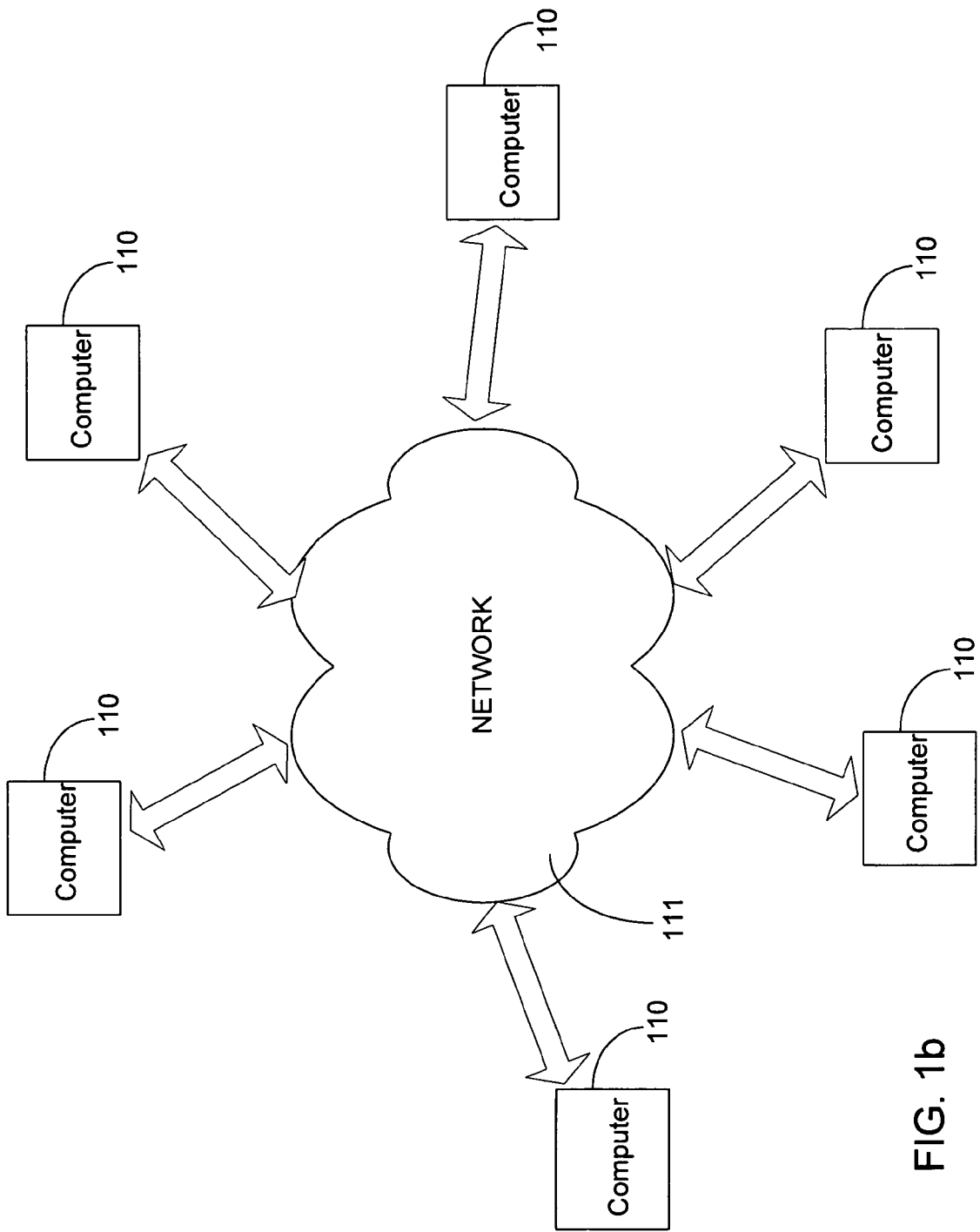
FIG. 1b is a block diagram generally illustrating an exemplary network environment which the present invention operates.

An example of a networked environment in which the invention may be used will now be described with reference to FIG. 1B. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, servers or peers with respect to other computers. Accordingly, the various embodiments of the invention may be practiced on clients, servers, peers or combinations thereof, even though specific examples contained herein do not refer to all of these types of computers.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a failure notification (FN) facility guarantees that any member of a distributed group of computers 110 in a network 111 can communicate a failure notification to every other live member of the group. The FN facility is implemented in an application, service, operating system, or any other software executed on computers 110 in the network 111. The FN facility provides an application program interface (API) to other applications running on computers 110 in the network 111. The term "application" used herein refers to software using the FN facility of the present invention, and includes, but is not limited to, distributed systems, distributed applications, and middleware.

Figure 2:
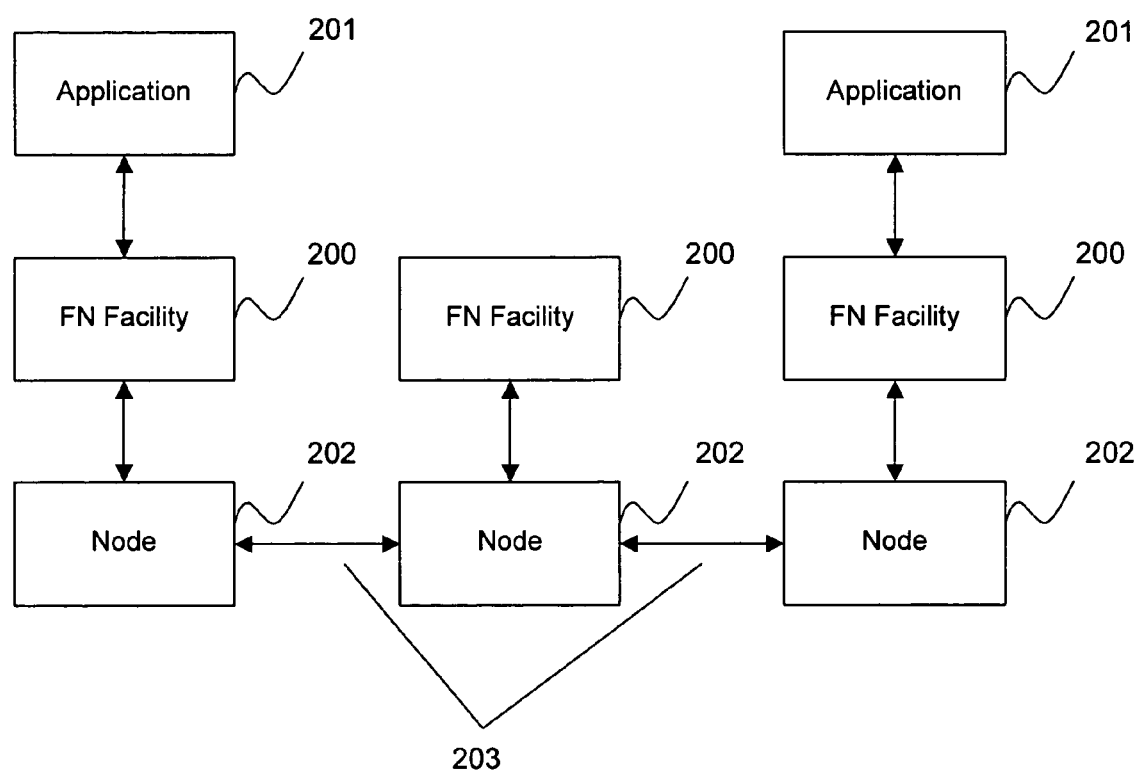
FIG. 2 is a block diagram illustrating the interaction between the application, failure notification facility, and network nodes in the present invention.

Computers 110 are referred to as "nodes" in network 111. "Failure notification (FN) group" refers to a group of cooperating nodes that provide the FN facility and act as a distributed system, wherein all members of the FN group reliably learn of a failure in the system. FIG. 2 depicts a hierarchical abstraction of the invention, illustrating that the FN facility 200 acts as an intermediary between the application 201 and nodes 202, which are connected to each other by communication links 203. A distributed application running on a group of nodes uses the FN facility to create a FN group, thus ensuring that all nodes running the distributed application will learn of system failures.

The invention may conceptually be understood to guarantee the receipt of failure notifications through an exemplary application of an embodiment of the present invention. Consider an FN group where every group member periodically pings every other group member with an "are you okay?" message. A group member that is not okay for any reason, either because of node failure, network disconnect, network partition, or transient overload, will fail to respond to some ping. This failure to respond is herein referred to generally as a communication failure. The group member that initiated the missed ping, and thus detected the communication failure, will ensure that a failure notification propagates to the rest of the group by ceasing to respond itself to all pings for that FN group and optionally by also passing a failure notification message to the other reachable FN group members. Accordingly, the invention ensures that the individual observation of a communication failure is converted in to a group notification. This scheme turns any pattern of disconnection, partition or failure in to a failure notification that every non-crashed party is guaranteed to receive.

Continuing to consider this exemplary application of the invention, another embodiment of the invention is described where explicit failure notification messages are sent upon noticing a failure. The effect of the explicit failure notification message is guaranteed to be experienced by every non-crashed party within twice the periodic pinging interval, regardless of whether some party is still able to communicate with other members of the group—this is because the invention implements explicit notification by having the node sending the explicit notification message stop responding to the pings confirming the continued existence of the group, in addition to actually sending the explicit notification message. For the remainder of the document, where not further elaborated upon, the term "the group is notified" will be understood to mean the certain transmission of the failure notification to all group members, optionally including the attempted explicit delivery of a failure notification message.

In accordance with a first embodiment of the invention, a method for guaranteeing failure notification in a distributed system is provided. In this method an FN group is created comprising a plurality of nodes in a network. The failure notification group is associated with a failure handling method of a distributed application running on some or all of the nodes of the failure notification group. A communication failure (which, as previously stated, may reflect the failure of a communication link, the failure of a node, or some other cause) between nodes in the failure notification group is detected by a node in the failure notification group. A failure notification is signaled when the communication failure is detected. When a node of the failure notification group receives the failure notification, the failure handling method on that node associated with the failure notification group is executed, if the handling method exists.

FN group creation is initiated by an application running on a creator node that calls the CreateGroup interface with a set of nodes to be included in the FN group. This call generates a globally unique failure notification identifier (FN ID) for the FN group. Each of the nodes in the set is contacted in some order (possibly concurrently) to verify the existence of the nodes. If all of the nodes in the set are successfully contacted—i.e., if there is a live communication link between the creator node and the other FN group members—then the FN group is successfully established on all members, and "success" is returned to the creator application.

The application creating the FN group associates an application state with that group by installing a failure handler on the creating node. In addition, the application on the creating node explicitly sends an application state to some or all of the FN group members in an application-specific manner, along with the FN ID of the FN group, in an invitation message. Each FN group member receiving the invitation message then establishes a failure handler for that FN group associated with the application state and FN ID contained in the invitation message. The failure handler is specific to the application running on the node receiving the invitation message and the relevant application state. For example, the failure handler can perform garbage collection of application state associated with the FN group, or the failure handler can attempt to re-establish the application state using a new FN group, or the failure handler can simply execute arbitrary code.

Any installed application state associated with an FN group is garbage-collected or otherwise updated by the application if a failure notification is received for that FN group. If an application attempts to associate a handler with an FN group that does not exist the failure handler is immediately invoked. This behavior is part of ensuring that failure notifications never fail to reach an FN group member that was ever aware of the FN group in the first place. An attempt to create an FN group always results in one of two possible outcomes: (1) the FN group creation succeeded and the creating application was notified of the FN group ID; or (2) the FN group creation failed, and the creating application is notified of the failure. Following a successful FN group creation, the creating application subsequently communicates to group members the group ID and any application state to be associated with the group, allowing them to establish failure handlers that act on that state upon failure notification.

Figure 3A:
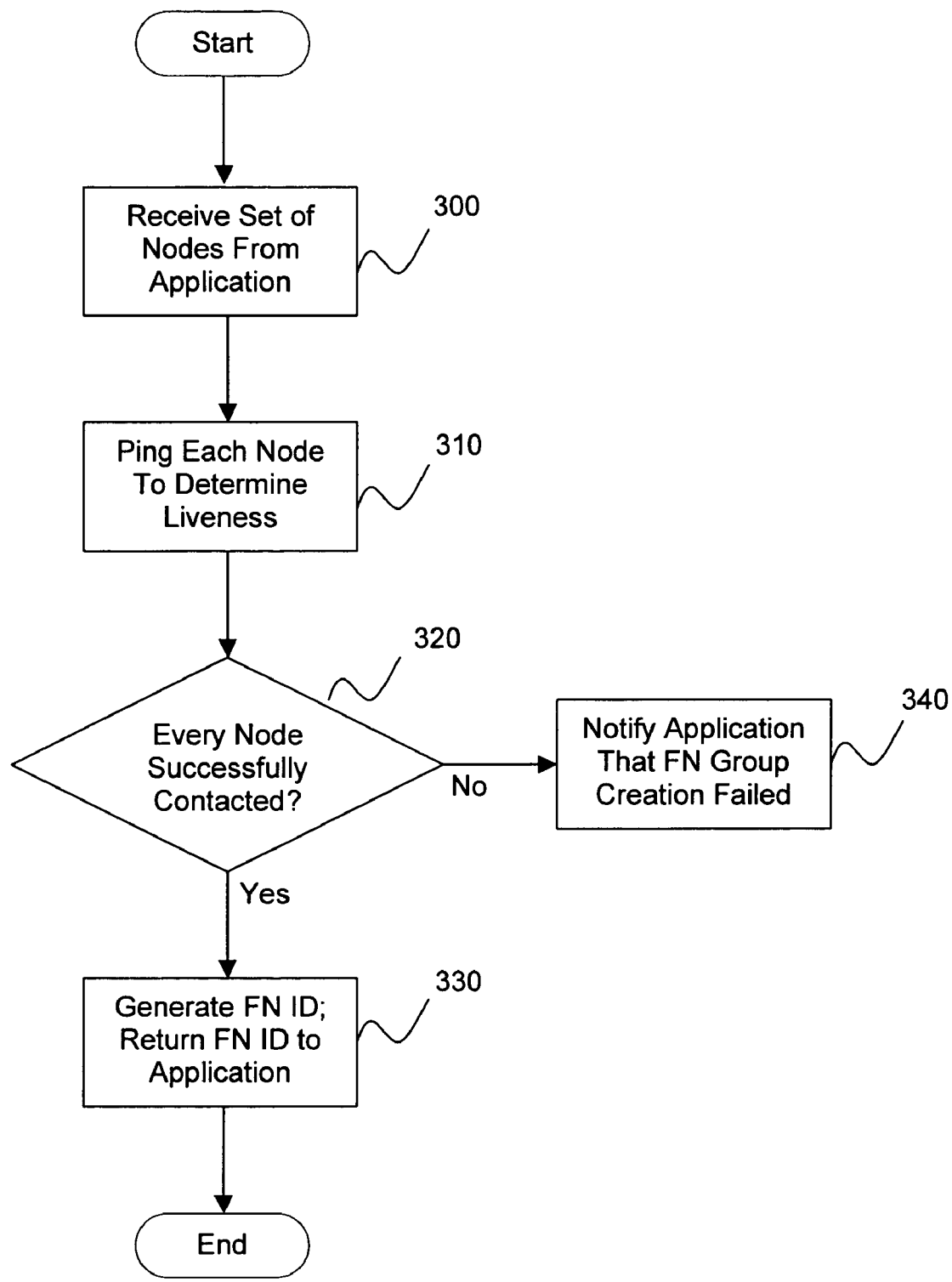
FIG. 3a is a flow diagram illustrating creation of a failure notification group by the present invention.

FIG. 3a illustrates the method executed by the FN facility when an application employs the FN facility to create an FN group. At step 300, the FN facility receives a set of nodes for the FN group. At step 310, the FN facility contacts every node in the set, determining whether it can successfully communicate with the potential FN group nodes. At step 320, if the FN facility determines that there it can successfully communicate to all the potential FN group nodes, the method proceeds to step 330; otherwise, the method proceeds to step 340, where the FN facility notifies that the FN group creation failed. At step 330, the FN facility generates an FN ID and returns that FN ID to the application, indicating that the FN group was successfully created.

Figure 3B:
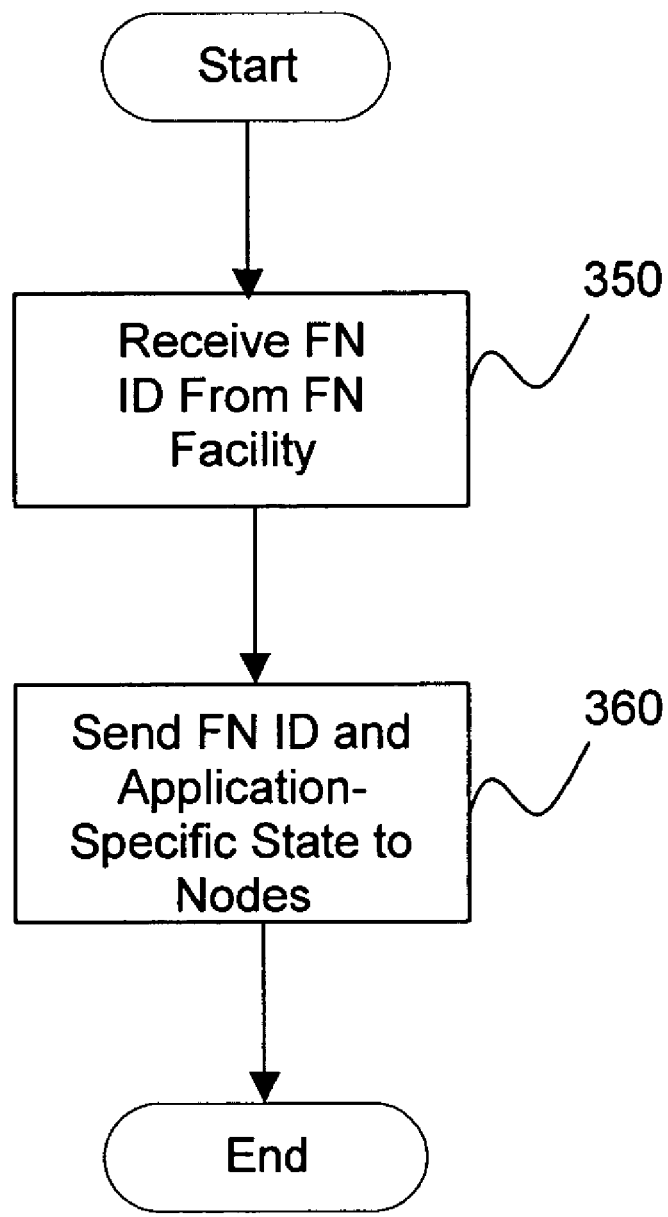
FIG. 3b is a flow diagram illustrating steps taken by an application in creating a failure notification group using the present invention.

FIG. 3b illustrates the method executed by the application after receiving an FN ID from the FN facility. At step 350, the application receives the FN ID from the FN facility. At step 360, the application sends a message to an application on the FN group nodes indicating the FN ID of the FN group and an application state that is associated with the FN ID. Applications on the FN group nodes receive the message that includes the FN ID and application state, and then register an application failure handling method with the FN ID using the FN facility on that node. This registration is performed by calling the RegisterFailureHandler function of the FN facility, explained below. The application on the creator node also registers a failure handling method in the same way.

An advantage of this approach is that applications on FN group nodes never learn about groups that cannot be established, meaning that there will be fewer cases of establishing application state and associated failure handlers, only to have the failure handler called and then having to garbage collect the state soon thereafter. A second advantage is that applications have more flexibility about when, if, and how they communicate the information about the FN group and any state associated with it to group members.

Applications on each node participating in the FN group register a failure handler for failure notifications in that FN group using the RegisterFailureHandler function. This function takes as its parameters a failure handling method and an FN ID and registers the FN ID with the failure handling method. The failure handling method is invoked whenever the FN group having the FN ID is notified, either because of a detected failure or because an application explicitly signaled a failure event on one of the FN group members. If RegisterFailureHandler is called with a FN ID parameter that has already been signaled as failed or does not exist, the failure handling method is invoked immediately.

When the RegisterFailureHandler function is called by an application, the FN facility associates the failure handling method with the FN ID. Accordingly, when a failure notification is received indicating the FN ID, the FN facility recognizes the FN ID as associated with the application failure handling methods, and executes those failure handling methods.

After an FN group is created, an application on an FN group node can explicitly signal a failure notification even when there have been no failures among the FN group members by calling the SignalFailure function. The SignalFailure function takes as its parameter the FN ID of the FN group in which the failure notification is to be signaled. There are many reasons that an application might call this function; an example of such a scenario is when the application decides that a communication link is insufficient for its application-specific purposes (and possibly even though the FN facility is managing to communicate across the link). In the embodiment of the invention described previously, when SignalFailure is called, the FN facility notifies FN group members of a failure by ceasing to respond to ping messages for the FN group. However, the FN facility will still respond to messages not related to the FN group, e.g. ping messages for another FN group. An additional implementation may also send explicit failure notification messages to reachable FN group members.

FIG. 4a shows the API of this embodiment of the invention, including the CreateGroup, RegisterFailureHandler, and SignalFailure functions. FIG. 4b shows the API of another embodiment of the invention, to be described below.

Each node in the FN group must maintain connectivity to one or several other nodes in the FN group in order to regularly verify the continued existence of the FN group. The method used for maintaining this connectivity depends on the scalability, reliability, and security requirements of the user. One method of maintaining connectivity in the FN group is where the creator node notifies all FN group members of the other members in the FN group. Then, each node in the FN group periodically pings every other node in the FN group (this ping could be implemented as a User Datagram Protocol (UDP) ping, opening a TCP socket, or one of any number of well-known liveness checking methods). If a communication failure is detected—e.g., a pinged node fails to respond—a failure notification is signaled to the rest of the FN group. Because of the $O(n^2)$ message complexity required by the periodic pinging, this approach does not scale well to even medium-sized FN groups. Furthermore, the aggregate network ping traffic is likely to be additive in the number of FN groups that exist in the system. However, it has the advantage of not requiring any infrastructure support.

FN group notifications will sometimes be generated unnecessarily, and such a notification is referred to as a false positive. For example, one cause of a false positive is a transient link failure. The invention tries to minimize the number of false positives. The false positive rate of this method is aided by the fact that liveness and connectivity monitoring does not involve any third-party "intermediary" nodes that might themselves contribute additional failures. However, because all $O(n^2)$ potential communication paths are monitored, and most applications in practice only use a small subset of these paths, there is the potential to observe many more transient communication failures than would be visible if only actually-used communication paths were being monitored.

The notification latencies provided by this approach are low, with the worst-case latency being two timeout intervals and the average case latency being less than one timeout interval. Most importantly, the susceptibility to security attacks for this approach is very low. No malicious node in the system can prevent the members of an FN group from receiving failure notifications caused by nodes other than the malicious node itself. Malicious nodes can also only mount denial of service (DoS) attacks against FN groups that they belong to, at least if FN group members have some means of authenticating the sender of a failure notification.

Accordingly, a method for guaranteeing failure notification in a distributed system is provided. By ensuring that failure notifications never fail, the invention greatly simplifies failure handling among nodes that have a state that they want to handle in a coordinated fashion. The invention efficiently and reliably notifies all members of an FN group of any failure condition affecting the group. Applications using the invention do not need to worry that a failure message did not get through or that an orphaned state remains in the system.

In another embodiment of the invention, an alternative method for creating a failure notification group is provided. Like the prior embodiment, FN group creation is initiated by an application at a creator node calling the CreateGroup interface with the set of nodes to be included in the FN group. Unlike the prior embodiment, the function takes as a parameter an application state in addition to the node set parameter. A modified API is depicted in FIG. 4b.

This embodiment of the invention generates a globally unique failure notification identifier (FN ID) for the FN group. Each of the nodes in the set is contacted in some order (possibly concurrently) and asked to join the new FN group being established. In this invitation message are included the FN ID of the FN group that is being established, as well as the application state to be associated with the FN group. If all of the invited nodes in the FN group successfully join the FN group, success is returned to the creator application. As with the prior embodiment, applications at each node in the FN group establish failure handlers for the application-state associated with the FN ID.

Should any FN group member be unreachable, the FN group establishment fails, returning "failure" to the application at the creator node and notifying all nodes that already received the invitation message. Group members that learned of the FN group but subsequently become unreachable similarly detect the failure through their inability to communicate with other FN group members. This detected failure causes application specific failure handling (e.g., garbage collection) to occur for all application states associated with the failed group.

Figure 5:
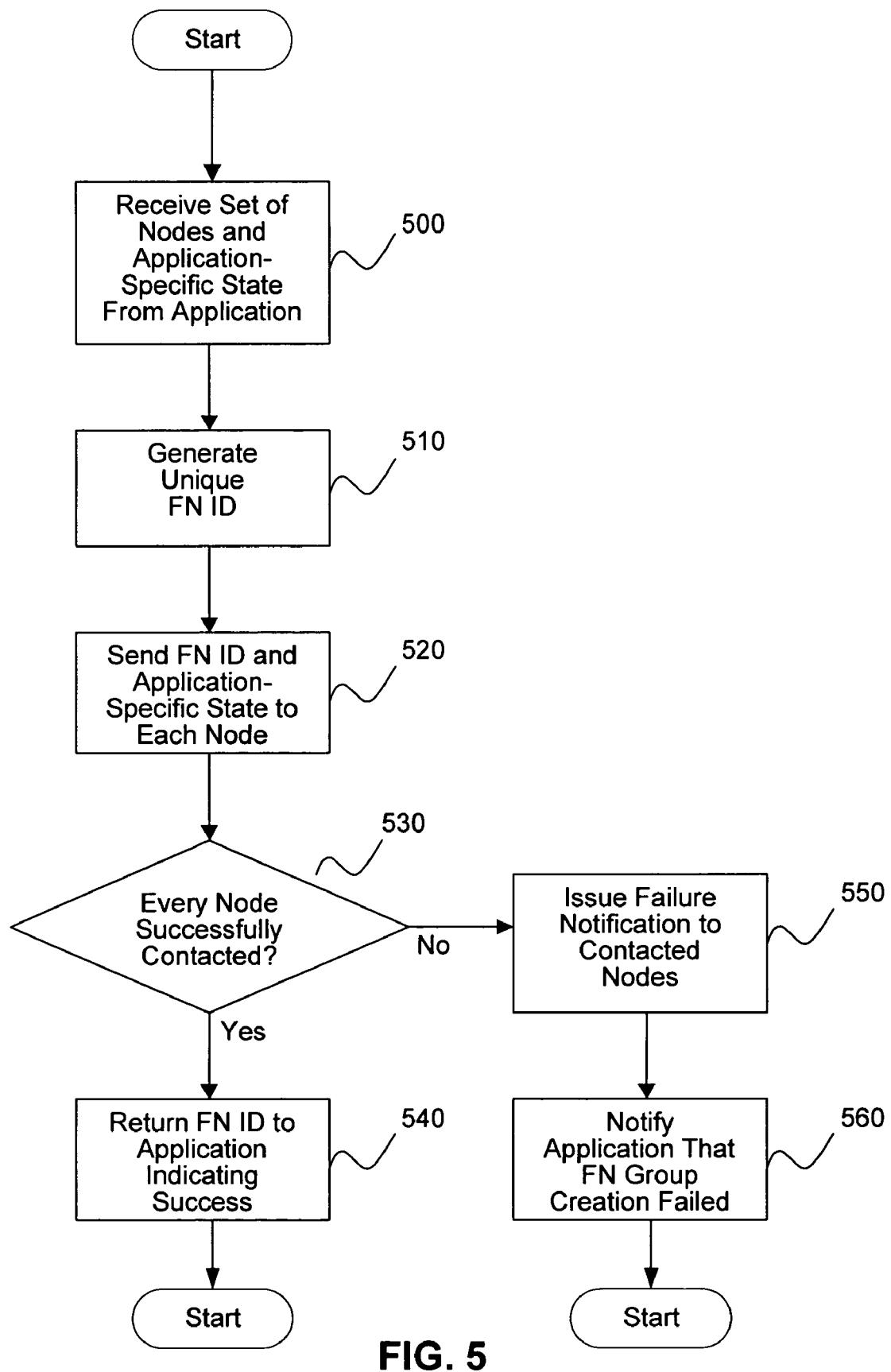
FIG. 5 is a flow diagram illustrating creation of a failure notification group by another embodiment of the present invention.

FIG. 5 illustrates the method executed by the FN facility when an application employs the FN facility to create an FN group. At step 500, the FN facility receives a set of nodes for the FN group and an application state to associate with the FN group. At step 510 the FN facility generates an FN ID. At step 520, the FN facility sends an invitation message containing the FN ID and the application state to each node in the set of nodes. At step 530, if all nodes successfully receive the invitation message, the method proceeds to step 540, where the FN facility notifies the application that the FN group was successfully created, and returns the FN ID. If not all nodes successfully received the invitation message, the method proceeds to step 550, where the FN facility issues a failure notification message to the FN group nodes that already joined the FN group by accepting the invitation message. At step 560, the FN facility notifies the application that the FN group was not successfully created. Applications register failure handlers as with the prior embodiment.

Thus, attempting to create an FN group always results in one of two possible outcomes: (1) the FN group creation succeeded, FN group members received application state to associate with the group, and FN group members established failure handlers for the group (e.g., to garbage-collect that state) upon failure notification; or (2) the FN group creation failed, and any FN group members that were notified of application state to associate with the FN group had their failure handlers called (perhaps causing them to garbage-collect that state). Hence, FN group failure during (or after) creation leads to all state associated with the FN group being reclaimed.

In a further embodiment of the invention, another method of maintaining connectivity is provided. A spanning tree is constructed among nodes of a FN group to monitor connectivity and liveness. To construct a spanning tree, each node in the FN group is thought of as a vertex in a graph, and connections are made between nodes so that every node in the graph is connected without a circuit in the graph. These connections implement a routing topology resembling a spanning tree. Connections between nodes are formed when a first node records a pointer to a second node as a child node, and the second node likewise records a pointer to the first node as a parent node.

Figure 6:
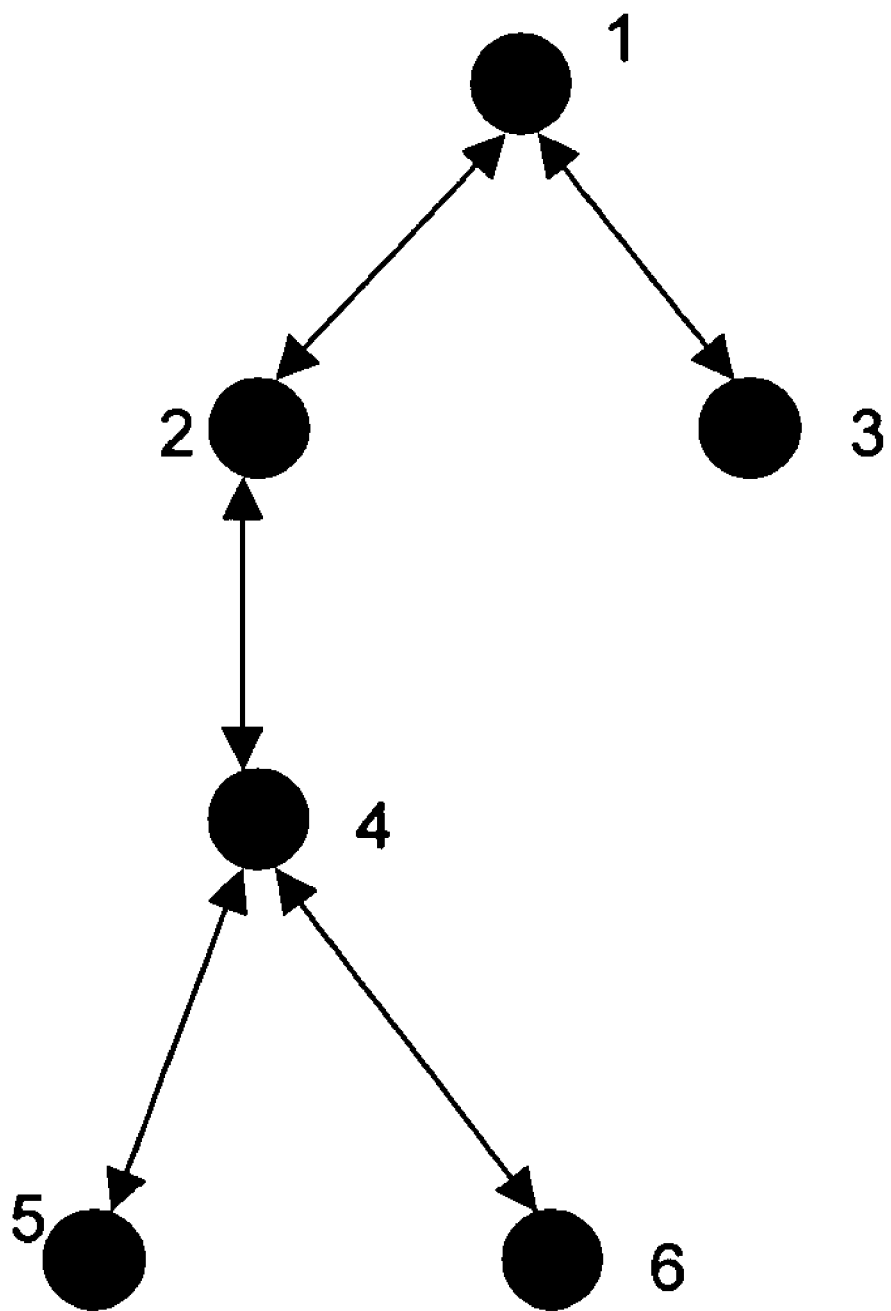
FIG. 6 depicts an example spanning tree failure notification topology of the present invention.

For example, FIG. 6 shows an example spanning tree where the creator node, Node 1, is the root node of the tree, and Node 1 has recorded pointers to Nodes 2 and 3, which are Node 1's child nodes. Nodes 2 and 3 have both recorded pointers to Node 1 as their parent node. Node 2 has also recorded a pointer to its child node, Node 4. Node 4 has recorded a pointer to Node 2 as its parent node, and has recorded pointers to Nodes 5 and 6 as its child nodes. Nodes 3, 5, and 6 have no child nodes to point to, and are thus leaves of the spanning tree.

In this method for maintaining connectivity, each node in the tree only pings its adjacent nodes. Nodes are adjacent in a tree if they are part of a parent-child relationship. For example, in FIG. 6, Node 4 is adjacent to Nodes 2, 5, and 6, whereas Node 3 is only adjacent to Node 1. Because each node only pings its parent and child nodes, the amount of pinging traffic is reduced. When a failure is detected, the detecting node stops responding to pings for the FN group. Additionally, it may also use the spanning tree to disseminate a failure notification message by sending the failure notification to its parent and child nodes. A node receiving a failure notification forwards the failure notification to its parent and child nodes. Accordingly, every node in the spanning tree— i.e., every node in the FN group—eventually learns of the failure by either detecting a communication failure through missed pings or receiving an explicit failure notification message.

This method supports groups of large size, but still generates a considerable amount of probing traffic if the system contains a large number of FN groups. The false positive rate of this method should be roughly similar to, and perhaps slightly less than that of the direct pinging method in that ping traffic takes place only among the member nodes of an FN group, but does not monitor all possible communication paths within the FN group. The average-case notification latency should also be roughly similar, assuming that broadcasting a notification message through the spanning tree can be done quickly. The worst-case notification latency will depend on the details of the tree construction algorithm used. An exemplary spanning tree algorithm that is well-known in the art is described in D. Karger, P. Klein, and R. Taijan. "A Randomized Linear-Time Algorithm to Find Minimum Spanning Trees." *Journal of the Association for Computing Machinery*, 42(2), 1995, which is hereby incorporated by reference in its entirety. The method of that paper takes as input a cost on each path; a method for assigning path costs that is well-known in the art is to use the round-trip path latency as the cost, where the latency is estimated by taking the median of three individual trials.

The susceptibility to security attacks of this method is to malicious group member nodes; nodes not belonging to the group cannot prevent failure notification messages from being delivered to group members, nor can they inject bogus failure notification messages to mount a DoS attack. However, a malicious group member can prevent other group members from hearing legitimate failure notifications, as well as being able to mount a DoS attack. Though the spanning tree approach of this method scales better than the direct pinging method, it still results in redundant probing traffic when the system contains many groups.

In accordance with a further embodiment of the invention, yet another method of maintaining connectivity is provided. This method uses an existing overlay network to monitor liveness and connectivity. An overlay network is an application-level routing topology among overlay nodes that exists and operates on top of an underlying routing topology (i.e. IP routing). One suitable overlay network implementation is SkipNet, described in commonly assigned U.S. patent application Ser. No. 10/356,961, which is hereby incorporated by reference in its entirety. Though any overlay network may be used, this method of maintaining connectivity is most advantageous when the overlay network will actively perform pinging among nodes in the overlay network to maintain liveness and connectivity in the network. This embodiment of the invention leverages the scalable overlay routing technology to monitor connectivity in an FN group by substituting the direct connectivity among FN group members provided by the underlying routing technology with the connectivity provided by the overlay network.

Figure 7:
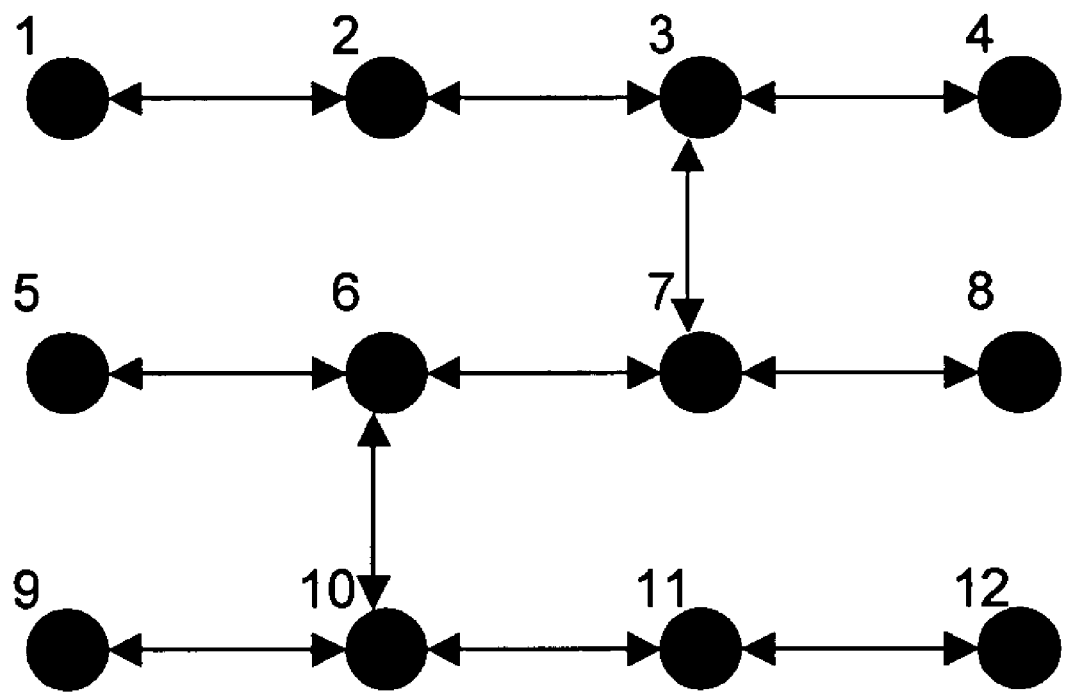
FIG. 7 depicts the communication topology of nodes in an exemplary overlay network.

An example overlay network topology is depicted in FIG. 7. The overlay network provides application-level routing among Nodes 1-12 in the overlay network. Each node in the overlay network maintains a routing table of nodes with which it has established a communication link. For example, in FIG. 5 Node 2 maintains pointers to Nodes 1 and 3 in its routing table, and Node 3 maintains pointers to Nodes 2, 4, and 7 in its routing table. Thus, if Node 4 sends a message to Node 1, the message must traverse Nodes 3 and 2 in the overlay routing path between Node 4 and 1. In order to maintain liveness and connectivity in the network, each node periodically pings the nodes in its routing table. If a node fails to respond to the ping, the sender of the ping updates its routing table to remove the non-responding node. If a node receives a ping from a node not in its routing table, it may update its routing table with a pointer to the new node.

To implement the FN facility on top of an existing overlay network, the overlay network must provide that 1) messages routed through the overlay network result in an application-level upcall on every intermediate node (from the perspective of the overlay network, the FN facility is treated as an application); and 2) changes in a node's routing table result in an application-level upcall detailing the change, which may be either an overlay communication failure or a change resulting from the appearance of a new neighbor node in the overlay network. That is, each overlay node must inform the FN facility of all messages crossing the node, and all routing table changes.

In this method for monitoring connectivity in the FN group, a multicast tree is constructed for disseminating failure notification. The multicast tree is basically a spanning tree of the FN group nodes, as previously described, but also including every node in the overlay routing path between the creator node of the FN group and all other nodes of the FN group. One type of multicast tree that could be constructed is a Scribe tree (See, M. Castro and P. Druschel and A. Kermarrec and A. Rowstron, "Scribe: A Large-Scale and Decentralized Application-Level Multicast Infrastructure," *IEEE Journal on Selected Areas in Communications (JSAC) (Special issue on Network Support for Multicast Communications)*, 20(8), October 2002, which is hereby incorporated by reference in its entirety). The invention assumes that the FN facility is running on every node that is to join the multicast tree.

The multicast tree is constructed when the FN group is created by the creator node. When the application sends each FN group node a set-up message containing an FN ID (and possibly an application state, as previously described), the set-up message sets an internal state that stores the FN group ID and the routing path neighbors used at each node it traverses in the overlay routing path between the creator node and the FN group node. This internal state indicates that the node is to deliver all messages received at that node, as well as all routing table change information, to the FN facility running on that node. As the set-up message traverses the nodes in the overlay routing path between the creator node and an FN group node, each node in the path records an FN group pointer to the node from which the message was received. As a confirmation message from the FN group node traverses the overlay nodes in that same path, using the recorded pointers, each node again records an FN group pointer to the node from which the confirmation message was received. Accordingly, a bi-directional communication link is created in the overlay routing path between the creator node and a FN group node that is specifically associated with the FN group.

In another embodiment of the invention, only a set-up message is required to create the multicast tree. As the set-up message traverses the nodes in the overlay routing path between the creator node and an FN group node, each node in the path records an FN group pointer to the node from which the message was received. In this embodiment, each node in the path also records an FN group pointer to the next node in the overlay routing path, to which it forwards the set-up message. This is achieved when the overlay network supports a "Next Hop" call, which can inform the FN facility running on an overlay node of which overlay node the message will next encounter when it continues being routed. Accordingly, a bi-directional communication link is created in the overlay routing path between the creator node and a FN group node that is specifically associated with the FN group.

In another embodiment of the invention, the set-up message is split into two messages, one of which travels directly between the group creator and the particular member being contacted, and one of which is routed using the routing path provided by the overlay. The direct message suffices to establish the group, and cause the FN facility to let the application know about the group at the creator node. The routed message must also complete soon thereafter to avoid a failure notification on the FN group. After the setup, connectivity is maintained along the overlay path.

Figure 8A:
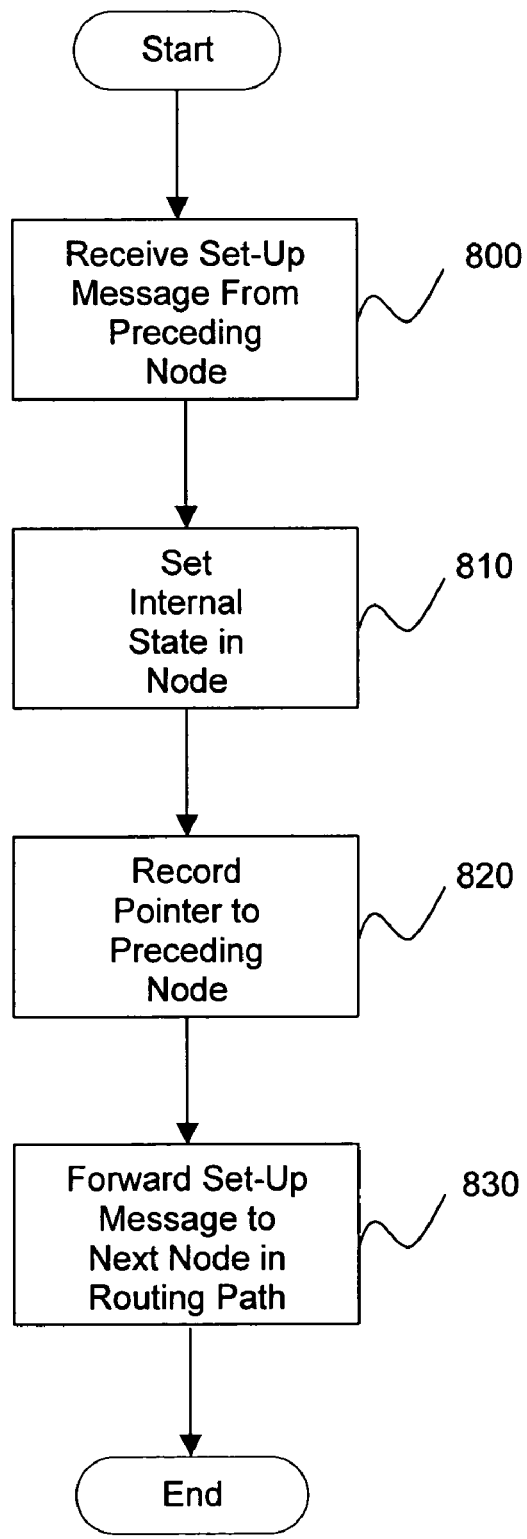
FIG. 8a is a flow diagram illustrating the steps taken by a node receiving a set-up message during creation of a multicast failure notification tree in the present invention.
Figure 8B:
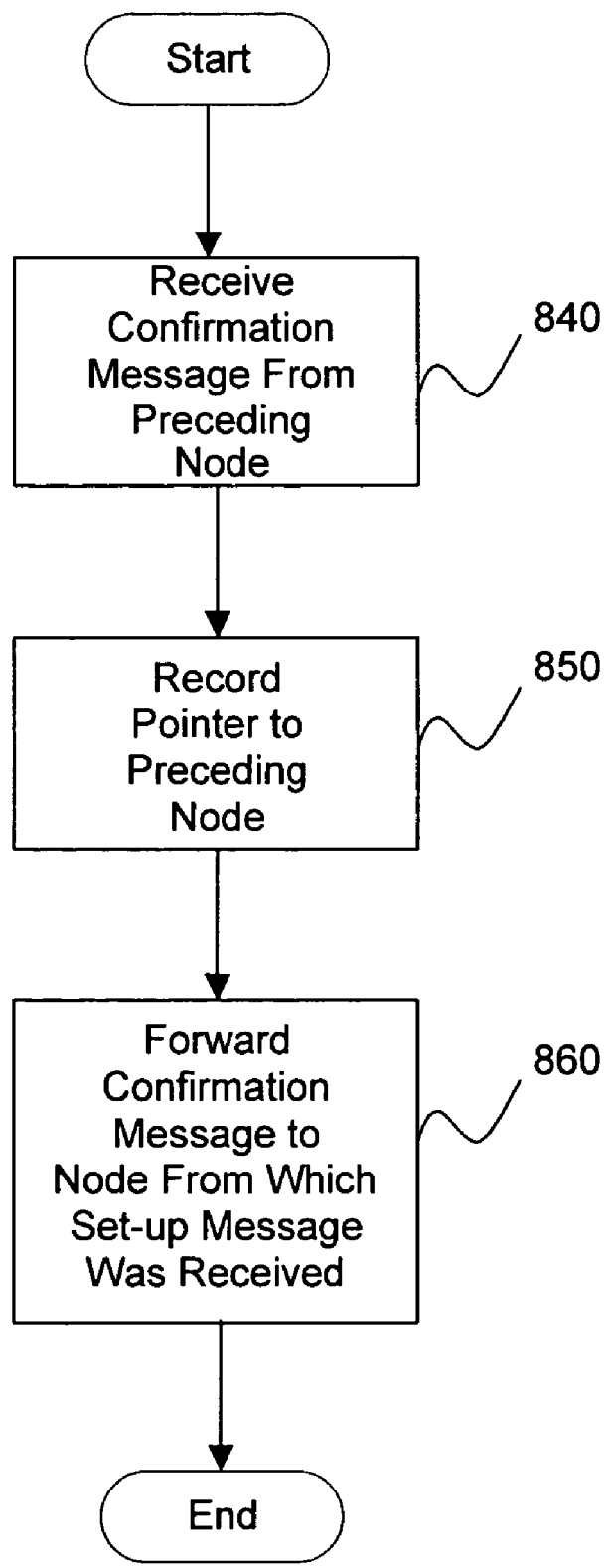
FIG. 8b is a flow diagram illustrating the steps taken by a node receiving a confirmation during creation of a multicast failure notification tree in the present invention.

FIG. 8a illustrates the method executed by the FN facility at each node in the overlay network receiving the set-up message from the creator node. At step 800, the FN facility on a node receives the set-up message from the node. At step 810, the FN facility sets up an internal state in the node. At step 820, the FN facility records a pointer to the node from which the message was received. At step 830, the FN facility forwards the set-up message to the next node in the overlay routing path. FIG. 8b illustrates the method executed by the FN facility at each node in the overlay network receiving the confirmation message from the FN group node. At step 840, the FN facility on the node receives the confirmation message from the node. At step 850, the FN facility records a pointer to the node from which the message was received. At step 860, the FN facility forwards the message to the node to which it recorded a pointer in step 820.

Consider the overlay network in FIG. 7, where Nodes 1, 4, 5, and 8 are nodes in an FN group. Node 4, the creator node, sends set-up messages to Nodes 1, 5, and 8 either during or after the establishment of the FN group (i.e. the reachability of every node is determined). The message is received by Node 3, and an internal state is set in Node 3. A pointer to Node 4, associated with the FN group, is recorded at Node 3. The message is then forwarded to Node 2 (the next node in the overlay routing path to Node 1) and Node 7 (the next node in the overlay routing path to Nodes 5 and 8). Nodes 2 and 7 repeat the process, setting the internal state and recording pointers to 3 associated with the FN group. Node 2 forwards the message to Node 1, and Node 7 forwards the message to Node 6 (the next node in the overlay routing path to Node 5) and Node 8. Node 6 repeats the process, setting the internal state, recording a pointer to Node 7 associated with the FN group, and forwarding the message to Node 5.

When the messages are received at Nodes 1, 5, and 8, those nodes record a pointer to the node from which the message was received. Those nodes also determine that they are intended recipients of the set-up message from a message header. Instead of forwarding the message on, Nodes 1, 5, and 8 send a confirmation message back to creator node 4. The confirmation message uses the pointer path created by the set-up message to traverse the overlay routing path back to the creator node. Thus, the confirmation message traverses the same overlay routing path as the set-up message. Each node in the overlay routing path receiving the confirmation message records a pointer to the node from which the message was received.

Figure 9:
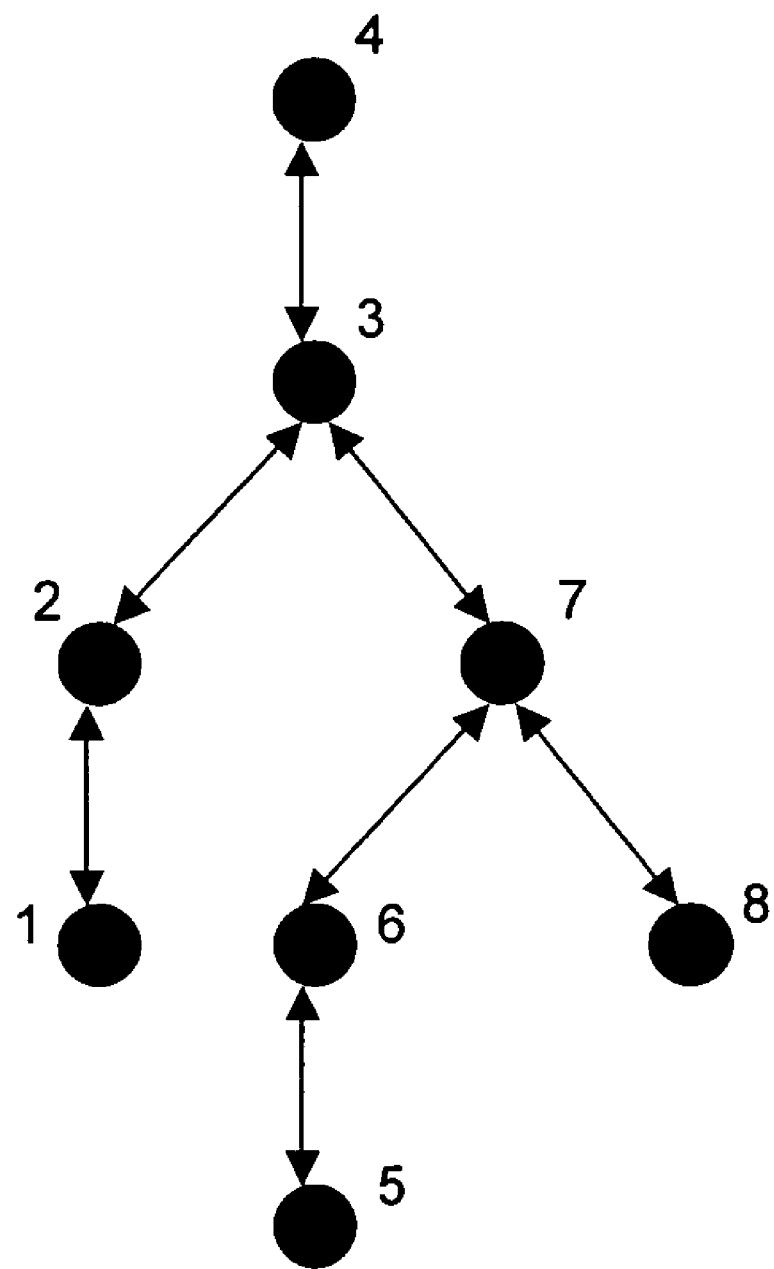
FIG. 9 depicts a communication topology of an exemplary multicast failure notification tree of the present invention.

For example, Node 5 forwards a confirmation message to Node 6, which records a pointer to Node 5. Node 6 forwards that confirmation message to Node 7, which records a pointer to Node 6. Node 7 forwards the confirmation message to Node 3, which records a pointer to Node 7. Node 3 forwards the confirmation message to Node 4, which records a pointer to Node 3. Nodes 1 and 8 likewise send confirmation messages to Node 4. When Node 4 receives confirmation messages from all nodes in the FN group, Node 4, the creator node, determines that the FN group has been successfully created. A multicast tree has also been successfully created, the topology of which is illustrated in FIG. 9. The multicast tree includes each node of the FN group (Nodes 1, 4, 5, and 8) and every node in each routing path between the FN group nodes and the creator node, Node 4. Thus, the multicast tree is represented in the following expressions:

Path $P_{1,4}$=Nodes 1, 2, 3, and 4

Path $P_{5,4}$=Nodes 6, 7, 3, and 4

Figure 10:
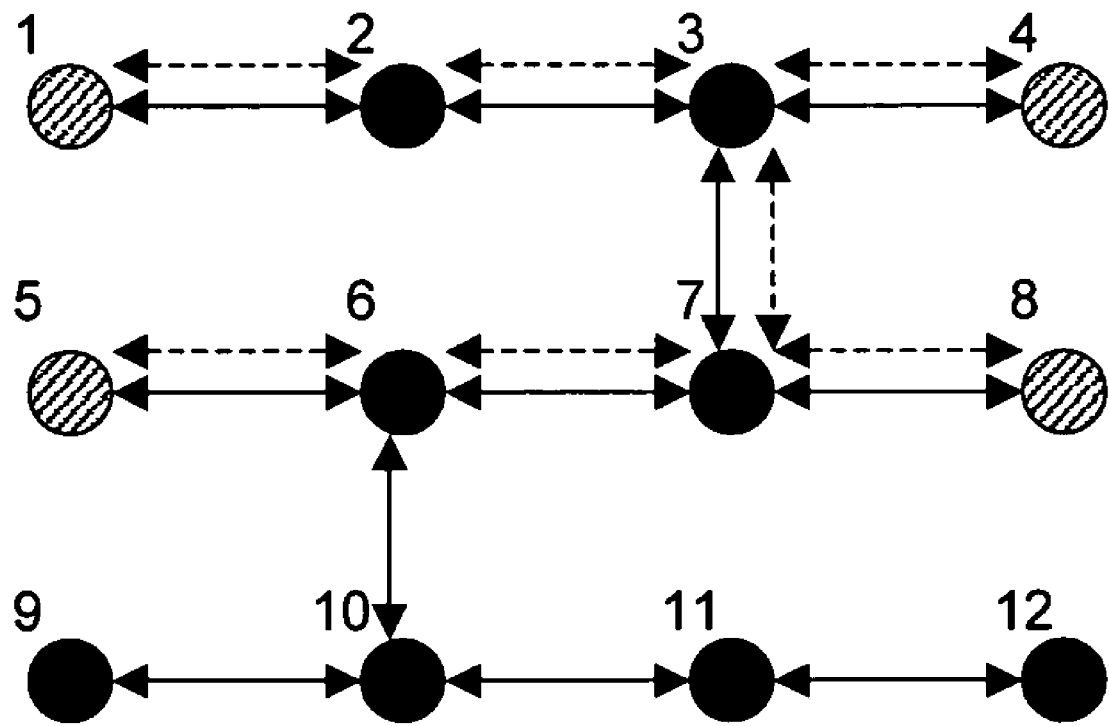
FIG. 10 depicts the communication topology of an exemplary multicast failure notification tree of the present invention superimposed on the overlay network communication topology of FIG. 7.

Path $P_{8,4}$=Nodes 8, 7, 3, and 4 where $P_{n,c}$ is the path of overlay nodes from an FN group node n to the FN group creator node c. Thus, Multicast Tree $T=P_{1,4} \cup P_{5,4} \cup P_{8,1}$ Accordingly, multicast tree T includes Nodes 1-8 of the overlay network. An illustration of the multicast tree T superimposed on the overlay network is depicted in FIG. 10 by the dotted arrows.

If the set-up message included an FN ID and an application state, each node in the FN group establishes a failure handling method associated with the application state and the FN ID when the set-up message is received. If the FN group is not successfully created (i.e., at least one node of the FN group cannot be reached), the creator node stops responding to pings for that FN group and sends a failure notification to those nodes that have already received the set-up message. The nodes that had received the set-up message and established a failure handling method then execute the failure handling method when the failure notification is received (thereby garbage collecting an application state). If the set-up message did not include an FN ID and application state, the creator node sends an FN ID and application state to the FN group nodes after the FN group is successfully created.

Each node in the overlay network periodically pings adjacent nodes to monitor liveness and connectivity to nodes in its routing table. Because the multicast tree is established on top of the overlay network, adjacent nodes in the multicast tree are necessarily adjacent nodes in the overlay network. When a node in the multicast tree makes a change in its routing table, that node notifies the FN facility running on the node. If the routing table change is just the addition of a new node, the change is ignored. However, if a node pings an adjacent node and the pinged node does not respond, the pinging node alters its routing table to remove the unresponsive node. Nodes are also removed from routing tables when they become full and are replaced by different nodes. The FN facility is notified of this change, and determines whether the overlay routing table change affects the FN group. For example, if Node 6 in FIG. 10 detects an overlay communication failure between it and Node 10, the FN facility on Node 6 will ignore the resulting routing table change, since Node 10 is not in the multicast tree associated with the FN group. However, if the routing table change at Node 6 indicated a communication failure in the overlay path to Node 5, the FN facility would determine that the overlay network communication failure is also a communication failure among nodes in the FN group.

Figure 11:
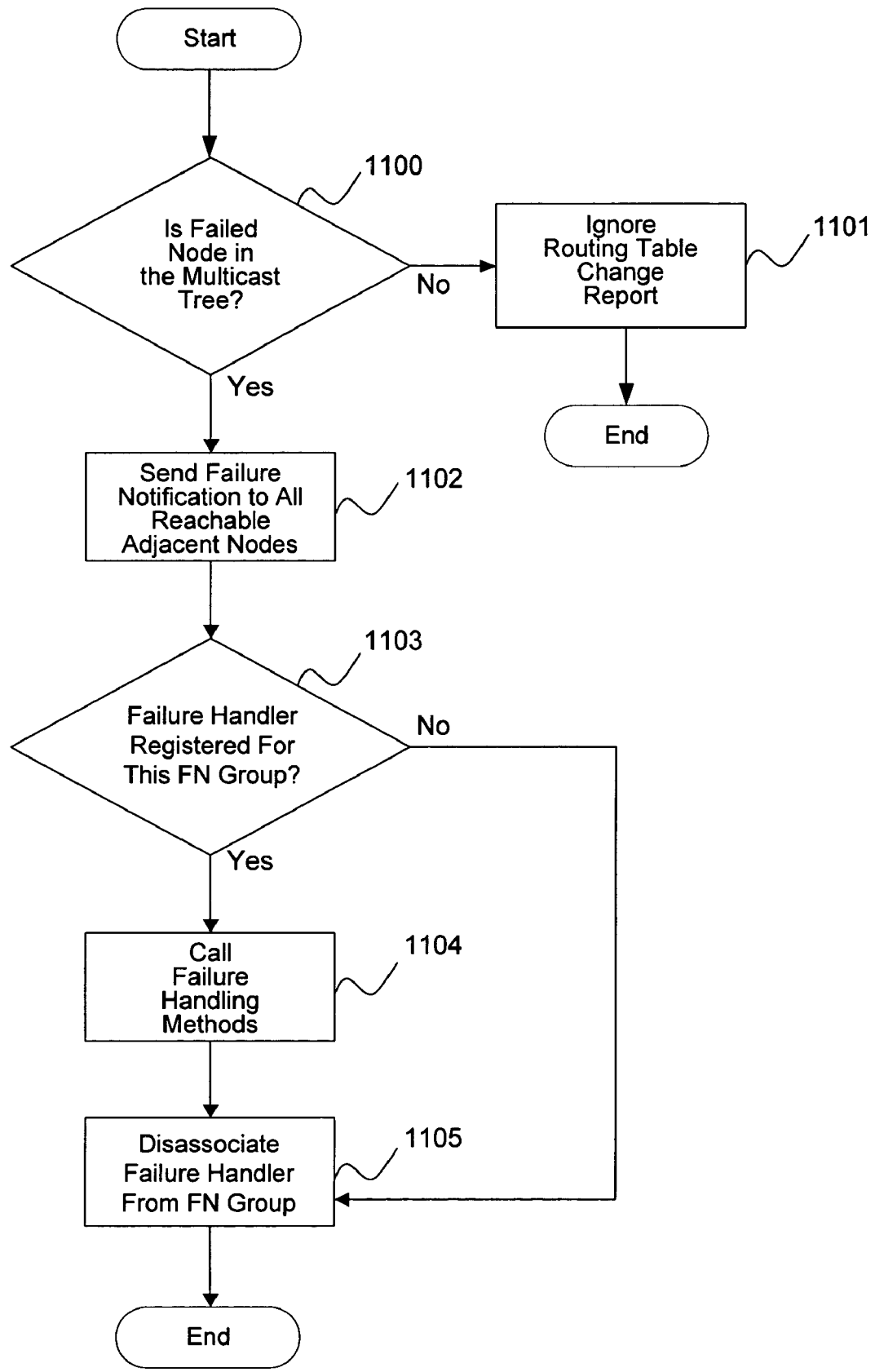
FIG. 11 is a flow diagram illustrating the steps take by a node in a multicast failure notification tree of the present invention when a communication failure is detected.

FIG. 11 illustrates the method executed by the FN facility upon receiving a routing table change report. At step 1100, the FN facility determines from the routing table change report whether overlay communication has failed with an overlay node that is also an adjacent node in the multicast tree. If not, the FN facility ignores the routing table change at step 1101; however, if the failed overlay node was an adjacent node in the multicast tree, the FN facility sends a failure notification message to all reachable adjacent nodes in the multicast tree at step 1102. At step 1103, the FN facility determines if there is a failure handler established for the FN ID associated with the multicast tree on which the failure was detected. If so, the FN facility calls the failure handling methods established for the FN ID at step 1104; if not, the FN facility proceeds directly to step 1105. At step 1105, the FN facility disassociates the failure handler with the FN ID. Steps 1102-1105 are also performed by the FN facility on every node receiving the failure notification message.

To illustrate the failure notification process, assume that Node 6 in FIG. 10 has failed and is no longer responding to pings from adjacent overlay nodes. Node 7 detects the overlay network communication failure when Node 6 fails to respond to pings. Node 7 changes its routing table to remove Node 6, and notifies the FN facility running on Node 7 of the change. The FN facility on Node 7 determines that because Node 6 is a node in the multicast tree, the overlay network communication failure between Nodes 6 and 7 implies a communication failure between at least two nodes in the FN group. In response, Node 7 sends a failure notification message to the adjacent nodes in the multicast tree that are still reachable: Nodes 3 and 8. When Node 3 receives the failure notification message, the message is passed to the FN facility running on Node 3. The failure notification message indicates the FN ID(s) for which a failure has been detected. The FN facility on Node 3 then forwards the failure notification message to adjacent nodes in the multicast tree or trees associated with the FN ID(s).

In this case, the failure notification message is forwarded to Nodes 2 and 4. The FN facility on Node 2 repeats the process performed at Node 3, and forwards the failure notification message to its adjacent node, Node 1. When the failure notification message is received at Nodes 1, 4, and 8, the message is passed to the FN facility. The FN facility recognizes that an FN ID in the message has a registered failure handler on that node. Accordingly, the FN facility calls the failure handling method established for that FN ID. The failure handler is then disassociated with the FN ID, since the FN group no longer exists.

Because of the failure at Node 6, Node 5 cannot receive a failure notification message. However, when Node 5 fails to receive a ping response from Node 6, Node 5 will remove Node 6 from its routing table and inform the FN facility on Node 5 of the change. The FN facility will determine that because Node 6 is an adjacent node in the multicast tree, the overlay network communication failure between Nodes 5 and 6 implies a communication failure between at least two nodes in the FN group associated with the multicast tree. The FN facility recognizes that the FN ID of the FN group in which the communication failure was detected is associated to a failure handler on Node 5. Accordingly, the FN facility calls the failure handling method established for that FN ID, and the failure handler is de-registered for that FN ID. Because no other nodes in the multicast tree are reachable, Node 5 does not forward a failure notification message.

Alternatively, an application on a node signals a failure notification message even if no overlay network communication failure was reported. If an application sends a message to another node in the FN group and does not receive a response, the application may use the FN facility to signal a failure in the FN group by ceasing to respond to FN group messages from other FN group nodes, causing those nodes to detect a failure in the FN group. Additionally, the implementation may also send a failure notification message to all reachable nodes in the multicast tree.

Because overlay routing links in use by the FN facility are pinged from both sides (by the FN facility if not by the overlay), a failed ping will result in one of two eventual actions: (1) a corresponding ping from the other side of the link will also fail, resulting in a second notification message that will cover that part of the multicast not reachable by the first notification message; or (2) a corresponding ping from the other side of the link succeeds, in which case the pinged multicast tree node responds to the ping with an indication that it has signaled a failure notification on the group. This then also results in a second notification message that will cover that part of the liveness chain not covered by the first notification message. In either case the result is that every non-crashed node of the multicast tree will eventually receive a failure notification message. This is true even if further node or link failures occur since these will merely result in additional failure reports and corresponding notification messages.

The approach just described can result in false positives whenever intermediate nodes fail or overlay routing tables change such that there is no longer a direct correspondence between multicast tree links and routing table links. The invention masks many of these false positives by implementing an auto-repair capability within the FN facility. When an FN group node detects a communication failure, it tries to establish a new multicast tree for the FN group instead of immediately calling the failure handlers of the application. If a new FN group cannot be successfully established within a timeout period, then each group member node delivers the pending failure notification to the application.

The invention can obtain sharing economies when there are multiple FN groups that have overlapping multicast trees. Each overlay network ping message is effectively monitoring all FN groups whose multicast trees include the corresponding overlay routing link. Furthermore, a single failure notification message can be sent between two overlay nodes that encodes the FN ID for all FN groups for whom a notification message should be sent across that link. Also, applications can establish multiple simultaneous FN groups.

To deal with crash recovery and slow clocks, nodes must be able to exchange and compare the set of FN groups that they are monitoring. Since there are potentially many groups, simply exchanging lists of FN IDs can be expensive. Instead, the invention uses a one-way hash function to generate a "checksum" over the set of FN IDs that a node is monitoring. This checksum can be cheaply exchanged between two nodes in order to confirm that nothing has changed since the last time the two nodes compared their FN ID lists with each other. As a result, full FN ID lists need only be exchanged when the set of groups being monitored by a node changes. Exchange of checksums occurs with every overlay network liveness ping by including the relevant checksum in the liveness ping message, and possibly also in the response message.

The scalability of this method is much better than that of the other methods presented: it is the only one in which the burden of network probe traffic is independent of the number of FN groups being maintained. With auto-repair, the invention produces a low rate of false positives. The cost of performing auto-repair will be dependent on the average number of overlay nodes that lie on the overlay routing path between any two given members of an FN group, as well as on the churn rate of overlay members. The number of intermediate nodes will depend both on the number of nodes belonging to the overlay, as well as any "locality" properties the overlay exhibits. For example, if SkipNet is used as the overlay network, then groups whose members are local to each other will experience lower auto-repair rates due to a reduced number of intermediate routing hops required to connect any two group members via the overlay network.

The notification latencies of this method are similar to those of the private, per-group spanning tree method, except that the number of communication hops taken by a notification message will typically be $O(\log n)$, where n is the number of nodes in the overlay network, rather than $O(\log m)$, where m is the number of nodes in an individual group. Unfortunately, the susceptibility to security attacks of this design is considerably more than for any of the other designs. Each FN group must trust nodes to behave correctly that are not members of the FN group. Indeed, since arbitrary overlay members must be trusted to correctly monitor liveness and forward failure notifications, the inclusion of untrusted third parties in the overlay would make third-party DoS attacks difficult to prevent. Thus, if the level of security offered by this method is not acceptable, then one of the other two methods previously discussed should be used instead.

Upon recovery from a crash, a node running the FN facility knows that a failure has occurred, and that it should clean up any out-of-date application state associated with any FN groups. If the application state is stored in volatile storage, the crash might have done this cleanup for the node. Also, the recovering node may not know whether a failure notification was propagated to other group members. Accordingly, the invention requires that nodes actively compare their lists of live FN groups as part of the messages checking liveness. Disagreements are resolved by triggering a notification on any groups already considered to have failed by some group member.

In one embodiment of the invention, nodes generate a failure notification due to disconnect only if two nodes were unable to exchange any traffic during a timeout interval. Thus, transient node crashes and communication failures lasting less than the timeout interval are masked unless they caused the application to explicitly trigger a failure notification.

In another embodiment of the invention, stable storage is used to attempt to mask short-lived node crashes. A node recovering from crash assumes that all the FN groups in which it participates are still alive; the active comparison of FN IDs suffices to reliably reconcile this node with the rest of the world. Furthermore, there is no compatibility issue: nodes employing stable storage could co-exist with nodes not employing stable storage. A communication failure on the node recovering from crash would still cause all the FN groups in which it participates to fail.

The invention guarantees that the FN facility will eventually notice if all communication between some subset of an FN group's members is impossible. However, an FN group member might still try to reliably send a message to another FN group member and have that attempt fail without the intended recipient being aware that something is amiss. For example, in wireless networks it is sometimes the case that link conditions will allow only small messages—such as liveness ping messages—to get through while larger messages cannot. To guarantee that nodes are able to communicate explicitly or will be made aware that they cannot, the invention requires that an application running on a node inform the FN facility on the node if it tries to communicate and fails (and hence wishes to trigger a notification). Thus a failure warranting a notification occurs when a send fails.

The invention also handles intransitive or asymmetric connectivity failures. If two nodes cannot communicate directly, but were both responding to messages coming from a third party, they might only experience a failure upon attempting to exchange a reliable message. The invention still guarantees that if either party were to trigger a notification at this point due to the send failure, all live FN group members would hear a notification.

The invention further handles the case where FN group members generate mixed acknowledged and unacknowledged traffic. For example, a node might send streaming video via User Datagram Protocol (UDP) alongside a control stream via Transmission Control Protocol (TCP). The application decides which delivery failures warrant triggering a notification. The invention does not monitor the application's traffic, and therefore an application that only sent traffic for which it did not expect an acknowledgment might not know whether to trigger a notification or not. The responsibility to decide that an unreliable link warrants a failure notification remains in the hands of the application.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of guaranteeing failure notification in a distributed system operating on a plurality of nodes in a network, the method comprising:

creating a failure notification group comprising the plurality of nodes, wherein the failure notification group has a unique identifier;

associating with the unique identifier of the failure notification group a failure handling method of a distributed application running on some or all of the nodes of the failure notification group;

each node in the failure notification group ascertaining whether a failure has occurred;

each node in the failure notification group that has ascertained a failure signaling a failure notification to each reachable node in the failure notification group, wherein each node in the failure notification group ascertains a failure or is notified of a failure; and each node in the failure notification group executing the failure handling method to perform an application level action in response to ascertaining a failure or being notified of a failure, wherein the nodes in the failure notification group are a subset of nodes in an overlay network, wherein creating a failure notification group includes creating a multicast tree by sending a construction message to each node in the failure notification group, further comprising receiving a confirmation message, wherein the construction message is routed to each node in the failure notification group through an overlay routing path, and upon receiving the confirmation message, each node in the overlay routing path records a pointer to a preceding node, and wherein the confirmation message is routed through the overlay routing path in reverse, and upon receiving the confirmation message, each node in the reverse overlay routing path records a pointer to a preceding node.

2. The method of claim 1, further comprising disassociating the failure handling method from the unique identifier after the failure is ascertained and the failure handling method has been executed.

3. The method of claim 1, wherein creating a failure notification group includes:

verifying that each node in the failure notification group exists; and generating the unique identifier for the failure notification group if each node in the failure notification group is successfully contacted.

4. The method of claim 3, wherein creating a failure notification group includes executing the failure handling method if each node in the failure notification group is not successfully contacted.

5. The method of claim 1, wherein creating a failure notification group includes:

generating the unique identifier for the failure notification group;
sending an invitation message containing an application state and the unique identifier to each node of the failure notification group; and
verifying that each member of the failure notification group received the invitation message.

6. The method of claim 5, further comprising, if any node in the group of nodes fails to receive the invitation,
signaling a failure notification to nodes that already received the invitation message; and
executing the failure handling method.

7. The method of claim 1, wherein signaling a failure notification includes sending a failure notification message to nodes in the failure notification group.

8. The method of claim 1, wherein signaling a failure notification includes failing to respond to a communication request from a node in the failure notification group.

9. The method of claim 1, wherein signaling a failure notification includes failing to respond only to communication requests related to a failure notification group for which a failure has been ascertained.

10. The method of claim 1, wherein ascertaining whether a failure has occurred includes ascertaining a failure in a communication link to at least one other node in the failure notification group.

11. The method of claim 1, wherein ascertaining whether a failure has occurred includes receiving from the application an instruction to signal the failure notification.

12. The method of claim 1, wherein ascertaining whether a failure has occurred includes having failed to repair the failure notification group one or more times.

13. The method of claim 1, wherein ascertaining whether a failure has occurred includes distinguishing between a communication failure between two nodes that are both in the failure notification group and a communication failure between two nodes that are not both in the failure notification group.

14. The method of claim 1, wherein the failure is ascertained from an application pinging each node in the failure notification group, and determining the failure when a response to a ping is not received.

15. The method of claim 1, wherein the nodes in the failure notification group have a spanning tree topography, wherein the failure is ascertained from an application pinging adjacent nodes in the spanning tree, and determining the failure when a response to a ping is not received.

16. The method of claim 1, wherein the construction message is routed to each node in the failure notification group through an overlay routing path, and nodes in the overlay routing path record pointers to adjacent nodes in the overlay routing path.

17. The method of claim 1, wherein ascertaining whether the failure has occurred includes ascertaining that a communication link to a node in the overlay network has failed, and determining whether the node was a member of the multicast tree.

18. The method of claim 17, wherein if the node was a member of the multicast free, signaling a failure notification to adjacent nodes in the multicast tree.

19. The method of claim 17, wherein if the node was a member of the multicast tree, signaling a failure notification to adjacent nodes in the multicast tree by not responding to messages from the adjacent nodes.

20. The method of claim 17, wherein if the node was a member of the multicast tree, executing the failure handling method.

21. A method of guaranteeing failure notification in a distributed system operating on a plurality of nodes in a network, the method comprising:
receiving a unique identifier for a failure notification group, the failure notification group comprising the plurality of nodes;
associating with the unique identifier of the failure notification group a failure handling method of a distributed application running on some or all of the nodes of the failure notification group;
each node in the failure notification group ascertaining whether a failure has occurred;
each node in the failure notification group that has ascertained a failure signaling a failure notification to each reachable node in the failure notification group, wherein each node in the failure notification group ascertains a failure or is notified of a failure; and
each node in the failure notification group executing the failure handling method to perform an application level action in response to ascertaining a failure or being notified of a failure, wherein the nodes in the failure notification growl are a subset of nodes in an overlay network, further comprising joining a failure notification tree, including: receiving a construction message from a creator node through an overlay routing path; and recording a pointer to adjacent nodes in the overlay routing path, further comprising sending a confirmation message to the creator node, wherein the construction message is routed to each node in the failure notification group through an overlay routing path, and upon receiving the confirmation message, each node in the overlay routing path records a pointer to a preceding node, and wherein the confirmation message is routed through the overlay routing path in reverse, and upon receiving the confirmation message each node in the reverse overlay routing path records a pointer to a preceding node.

22. The method of claim 21, further comprising performing garbage collection to disassociate the failure handling method from the application state after the failure is ascertained and the failure handling method is executed.

23. The method of claim 21, wherein signaling a failure notification includes sending a failure notification message to nodes in the failure notification group.

24. The method of claim 21, wherein signaling a failure notification includes failing to respond to a communication request from a node in the failure notification group.

25. The method of claim 21, wherein signaling a failure notification includes failing to respond to only communication requests related to a failure notification group for which a failure has been ascertained.

26. The method of claim 21, wherein ascertaining whether a failure has occurred includes ascertaining a failure in a communication link to at least one other node in the failure notification group.

27. The method of claim 21, wherein ascertaining whether a failure has occurred includes receiving from the application an instruction to signal the failure notification.

28. The method of claim 21, wherein ascertaining whether a failure has occurred includes having failed to repair the failure notification group one or more times.

29. The method of claim 21, wherein the failure is ascertained from an application pinging each node in the failure notification group, and determining the failure when a response to a ping is not received.

30. The method of claim 21, wherein the nodes in the failure notification group have a spanning tree topology, wherein the failure is ascertained from an application pinging adjacent nodes in the spanning tree, and determining the failure when a response to a pin is not received.

31. The method of claim 21, wherein ascertaining a failure includes distinguishing between a communication failure between two nodes that are both in the failure notification group and a communication failure between two nodes that are not both in the failure notification group.

32. The method of claim 21, wherein ascertaining whether the failure has occurred includes ascertaining that a communication link to a node in the overlay network has failed, and determining whether the node was a member of the multicast tree.

33. The method of claim 32, wherein if the node was a member of the multicast tree, signaling a failure notification to adjacent nodes in the multicast tree.

34. The method of claim 32, wherein if the node was a member of the multicast tree, signaling a failure notification to adjacent nodes in the multicast tree by not responding to messages from the adjacent nodes.

35. The method of claim 32, wherein if the node was a member of the multicast tree, executing the failure handling method.

36. A method of guaranteeing failure notification in a distributed system operating on a plurality of nodes in a network, wherein the plurality of nodes are a subset of nodes in an overlay network, the method comprising:
    joining a failure notification tree;
    ascertaining a failure in a communication link to an adjacent node in the tree; and
    signaling a failure notification when the failure is ascertained,
wherein joining the failure notification tree includes:
    receiving a first message from a creator node of a failure notification group through an overlay routing path;
    recording a pointer to an overlay node from which the first message was received;
    forwarding the first message to a node in the failure notification group via a next node in the overlay routing path;
    receiving a second message from the node in the failure notification group through the overlay routing path;
    recording a pointer to an overlay node from which the second message was received; and
    forwarding the second message to the creator node via the overlay node from which the first message was received.

37. The method of claim 36, further comprising recording a pointer to the next node.

38. The method of claim 36, wherein ascertaining a failure includes distinguishing between a communication failure between two nodes that are both in the failure notification group and a communication failure between two nodes that are not both in the failure notification group.

39. The method of claim 36, wherein ascertaining a failure includes having failed to repair the failure notification group one or more times.

40. The method of claim 36, wherein ascertaining the failure includes ascertaining tat a communication link to a node in the overlay network has failed, and determining whether the node was a member of the multicast tree.

41. The method of claim 40, wherein if the node was a member of the multicast tree, signaling a failure notification to adjacent nodes in the multicast tree by not responding to messages from the adjacent nodes.

* * * * *